United States Patent [19]

Ono

[11] Patent Number: 5,299,130
[45] Date of Patent: Mar. 29, 1994

[54] APPARATUS FOR CONTROLLING MOVEMENT OF VEHICLE

[75] Inventor: Toyoichi Ono, 688-5, Tokunobu, Hiratsuka-shi, Kanagawa-ken 254, Japan

[73] Assignee: Toyoichi Ono, Japan

[21] Appl. No.: 623,659

[22] PCT Filed: May 1, 1989

[86] PCT No.: PCT/JP89/00459

§ 371 Date: Sep. 25, 1991

§ 102(e) Date: Sep. 25, 1991

[87] PCT Pub. No.: WO90/13856

PCT Pub. Date: Nov. 15, 1990

[51] Int. Cl.$^5$ .................. G06F 15/50; G01S 1/20
[52] U.S. Cl. ................. 364/424.02; 364/449; 180/167; 342/387; 342/457; 342/463
[58] Field of Search ............. 364/424.02, 443, 449, 364/569; 180/167, 169; 342/356, 357, 381, 384, 387, 388, 389, 390, 391, 392, 450, 451, 457, 463

[56] References Cited

U.S. PATENT DOCUMENTS

| | | | |
|---|---|---|---|
| 3,150,372 | 9/1964 | Groth, Jr. | 342/387 X |
| 4,314,251 | 2/1982 | Raab | 342/463 |
| 4,350,983 | 9/1982 | Blaha et al. | 342/387 X |
| 4,604,717 | 8/1986 | Kaplan | 364/569 |
| 4,644,358 | 2/1987 | Sekine | 342/357 X |
| 4,700,301 | 10/1987 | Dyke | 364/424.04 |
| 4,719,469 | 1/1988 | Beier et al. | 342/357 X |
| 4,797,679 | 1/1989 | Cusdin et al. | 342/387 |
| 4,855,962 | 8/1989 | Regnaudin et al. | 342/463 X |
| 4,879,713 | 11/1989 | Ichiyoshi | 342/357 X |
| 4,888,593 | 12/1989 | Friedman et al. | 342/387 |
| 4,894,655 | 1/1990 | Joguet et al. | 364/449 X |
| 4,897,661 | 1/1990 | Hiraiwa | 342/457 |
| 4,924,699 | 5/1990 | Kuroda et al. | 364/449 X |
| 5,019,828 | 5/1991 | Schoolman | 342/457 |
| 5,021,792 | 6/1991 | Hwang | 342/357 |
| 5,101,356 | 3/1992 | Timothy et al. | 364/449 |
| 5,144,318 | 9/1992 | Kishi | 342/357 |
| 5,185,610 | 2/1993 | Ward | 342/357 |

FOREIGN PATENT DOCUMENTS

54-117705 9/1979 Japan .
57-39701 3/1982 Japan .
60-233710 11/1985 Japan .

Primary Examiner—Thomas G. Black
Assistant Examiner—Collin W. Park
Attorney, Agent, or Firm—Welsh & Katz, Ltd.

[57] ABSTRACT

An apparatus for controlling the movement of a vehicle such as a damp truck or the like so as to allow the movement of the vehicle to be correctly induced is disclosed. With the apparatus constructed to the present invention, a first electric wave ($m_1$), a second electric wave ($m_2$) and a third electric wave ($m_3$) are transmitted in synchronization with each other from predetermined locations on the ground different from each other. Then, the electric wave ($m_1$), the electric wave ($m_2$) and the electric wave ($m_3$) are received by two antennas mounted on the vehicle (20), whereby the position where the vehicle (20) is presently located and the attitude angle assumed by the vehicle (20) are detected based on the difference between the time the electric wave ($m_1$) reaches the vehicle (20) and the time when the electric wave ($m_2$) reaches the vehicle (20) as well as the difference between the time when the electric wave ($m_1$) reaches the vehicle (20) and the time when the electric wave ($m_3$) reaches the vehicle (20).

7 Claims, 5 Drawing Sheets

| TARGET COURSE ID CODE | | X-COORDINATE | Y-COORDINATE | SPEED COMMAND | WORKING COMMAND | |
|---|---|---|---|---|---|---|
| | COURSE POSITION NO. | | | | | |
| A | 1 | $X_{A1}$ | $Y_{A1}$ | 0 | | ... |
| | 2 | $X_{A2}$ | $Y_{A2}$ | 20 | W | ... |
| | ⋮ | ⋮ | ⋮ | ⋮ | ⋮ | |
| | n | $X_{An}$ | $Y_{An}$ | 10 | | ... |
| B | 1 | $X_{B1}$ | $Y_{B1}$ | 0 | W | ... |
| | 2 | $X_{B2}$ | $Y_{B2}$ | 15 | | ... |
| | ⋮ | ⋮ | ⋮ | ⋮ | ⋮ | |

APPARATUS FOR CONTROLLING MOVEMENT OF VEHICLE

TECHNICAL FIELD

The present invention relates to an apparatus for controlling the movement of a working vehicle such as a damp truck or the like wherein the apparatus is intended to assist the vehicle to properly perform a given operation and moreover allow the vehicle to move in an unmanned manner, i.e., without necessity for any driver to be ridden on the vehicle.

BACKGROUND ART

With respect to an apparatus for allowing a vehicle to move along a preset target course while the movement of the vehicle is automatically induced, it is essential that the apparatus exactly detects the position where the vehicle is presently located, and performances of the apparatus are practically determined depending on how exactly the present position of the vehicle is detected.

A conventional apparatus of the foregoing type which assures that the target course can be changed to another one, i.e., a conventional apparatus of the foregoing type having excellent flexibility in respect of a target course to be assumed by the vehicle is typically disclosed in an official gazette of, e.g., Japanese Laid-Open Patent NO. 70618/1986 which is titled "System for allowing a vehicle to move in an unmanned manner". According to the system of the prior invention, as the vehicle moves, a distance of movement of the vehicle on a two-dimensional coordinate is sequentially calculated with reference to the speed of movement of the vehicle and the orientation angle of movement of the vehicle so that the present position of the vehicle on the two-dimensional coordinate is detected based on the sequentially calculated values.

With the conventional apparatus as described above, the speed of movement of the vehicle is detected by a vehicle speed sensor and the orientation angle of movement of the vehicle is detected by a gyro-compass serving as an orientation sensor. For the reason, it is unavoidable that detection errors derived from these sensors are increased accumulatively. Especially, an error of the running speed appearing due to slippage of tires during movement of the vehicle and an error of the orientation angle appearing due to offset drift of the gyro-compass remarkably degrade the detection accuracy in respect of the position of the vehicle to be detected.

Therefore, the conventional apparatus has a drawback that induction control is generally accomplished with a deteriorated accuracy.

To obviate the foregoing drawback, a proposal has been made such that a station having suitable marks and induction cables laid thereon is installed at a known important location on the target course and a sensor is mounted on the vehicle to detect the magnetic field generated by the marks and the induction cables, whereby the detection error derived from the speed sensor and other components is periodically corrected based on outputs from the sensor. According to the aforementioned proposal having exterior induction units such as marks or the like employed therefor, however, the conventional apparatus has still a drawback that it fails to secure certain flexibility in respect of variation of the target course to another one to be assumed by the vehicle, because the target course is unchangeably determined.

The present invention has been made with the foregoing background in mind.

Therefore, an object of the present invention is to provide an apparatus for controlling the movement of a vehicle wherein the apparatus assures that the movement of the vehicle can exactly be induced while an advantage of flexibility in respect of a target course to be assumed by the vehicle is sustained.

DISCLOSURE OF THE INVENTION

The present invention provides an apparatus for controlling the movement of a vehicle wherein the apparatus includes electric wave transmitting means for transmitting a first electric wave, a second electric wave and a third electric wave in synchronization with each other from predetermined positions on the ground different from each other and an unit mounted on the vehicle.

Specifically, the unit mounted on the vehicle comprises a first antenna and a second antenna arranged on the vehicle in parallel with each other with a predetermined distance kept therebetween; first time difference detecting means for detecting the difference between the time when the first electric wave reaches the first antenna and the time when the second electric wave reaches the first antenna as well as the difference between the time when the first electric wave reaches the first antenna and the third electric wave reaches the third antenna, in response to the first electric wave, the second electric wave and the third electric wave each of which is received by the first antenna; position detecting means for detecting the position where the vehicle is presently located, based on the time differences detected by the first time difference detecting means; second time difference detecting means for detecting the difference between the time when the first electric wave reaches the first antenna and the time when the first electric wave reaches the second antenna, in response to the first electric wave received by the first antenna and the second antenna; attitude angle detecting means for detecting the attitude with which the vehicle is moving, based on the time difference detected by the second time difference detecting means; storing means for allowing target course for the vehicle to be stored therein; calculating means for calculating a steering angle command for allowing the vehicle to move along one of the target courses, based on the position where the vehicle is presently located, the attitude angle with which the vehicle is moving and the target courses; and steering control means for controlling a steering angle to be assumed by the vehicle to a certain magnitude in conformity with the steering angle command.

With the apparatus of the present invention, the position where the vehicle is presently located and the attitude angle assumed by the vehicle are measured and determined based on the aforementioned differences in respect of the time when the electric waves are received by the antennas. In other words, the position and the attitude angle assumed by the vehicle are measured and determined without any necessity for a speed sensor, a gyro-compass or the like instrument.

Consequently, no accumulative error is present in the results derived from the measurements on the position where the vehicle is presently located and the attitude angle assumed by the vehicle, resulting in an accuracy in respect of induction control for the vehicle being improved remarkably.

In addition, since the target course can be changed to another one by changing the content of items stored in target course storing means, the apparatus of the present invention has excellent flexibility with respect to the changing of the present target course to another target course to be assumed by the vehicle.

BEST MODE FOR CARRYING OUT THE INVENTION

Now, the present invention will be described in detail hereinafter with reference to the accompanying drawings which illustrates a preferred embodiment of the present invention.

Figure 1:
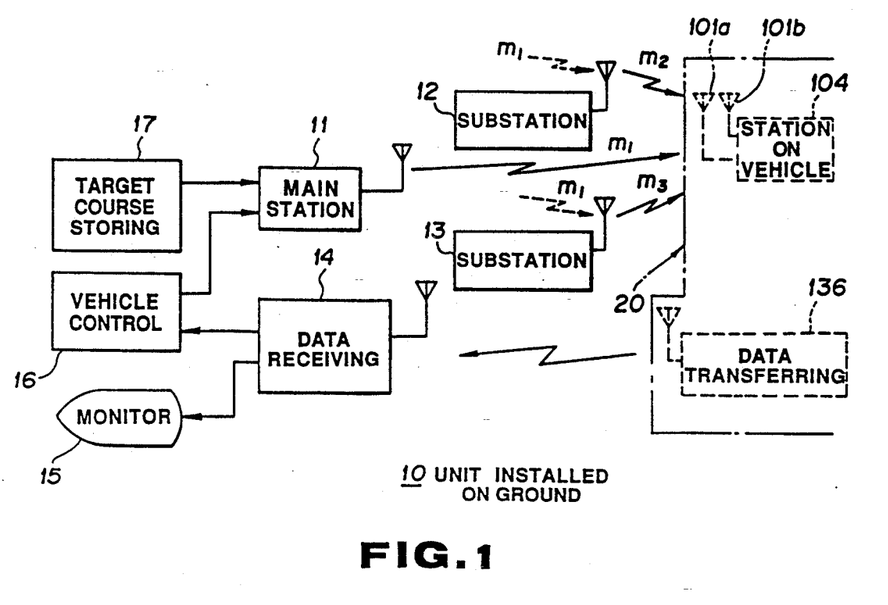
FIG. 1 is a block diagram which schematically illustrates by way of example the structure of an unit installed on the ground in accordance with the present invention.
Figure 2:
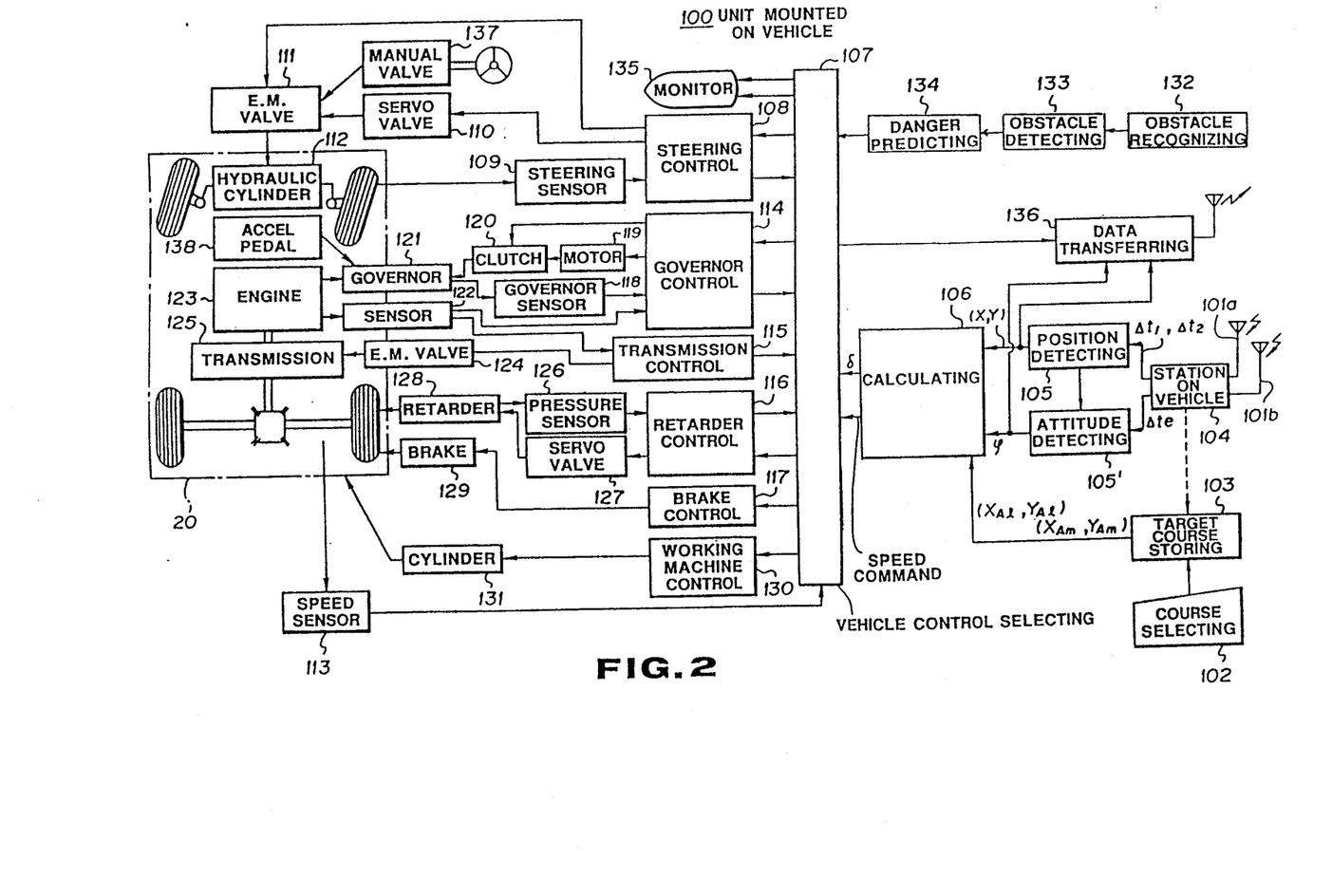
FIG. 2 is a block diagram which schematically illustrates an unit mounted on a vehicle in accordance with the present invention.

An apparatus for controlling the movement of a vehicle in accordance with the present invention comprises an unit 10 installed on the ground as shown in FIG. 1 and an unit 100 mounted on the vehicle as shown in FIG. 2.

The unit 10 installed on the ground includes a main station 11 which has a function of transmitting an electric wave $m_1$. In addition, the unit 10 includes substations 12 and 13 which have a function of transmitting electric waves $m_2$ and $m_3$ in synchronization with the electric wave $m_1$.

Specifically, on receipt of the electric wave $m_1$ transmitted from the main station 11, the substations 12 and 13 extract a synchronizing signal therefrom and then transmit the electric waves $m_2$ and $m_3$ in synchronization with the synchronizing signal.

It should be noted that the phase of the electric wave $m_1$ is deviated from the phase of the electric wave $m_2$ by a quantity of time which is determined by dividing the distance between the main station 11 and the substation 12 (constant value) with a transmission speed of the electric wave, while the phase of the electric wave $m_1$ is deviated from the phase of the electric wave $m_3$ by a quantity of time which is determined by dividing the distance between the main station 11 and the substation 13 (constant value) with the speed of the electric wave.

Figure 3:
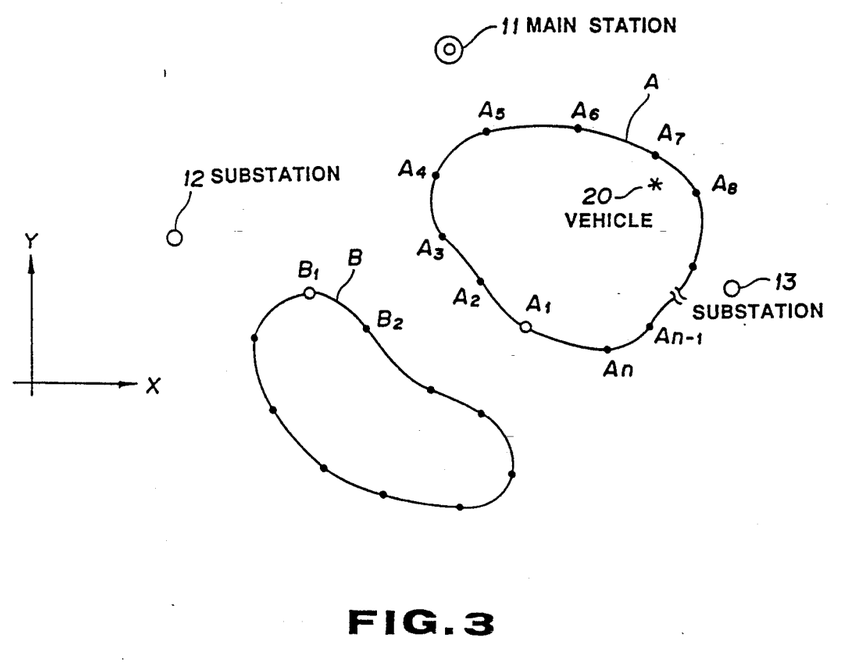
FIG. 3 is a schematic view which illustrates by way of example two running courses which are preset in working sites.

The main station 11 and the substations 12 and 13 are installed at predetermined positions in a working site as shown in FIG. 3 in order to detect the position where a working vehicle 20 such as a damp truck or the like is presently located and the attitude angle assumed by the vehicle 20.

First, description will be made blow with respect to a principle for detection the position where the vehicle 20 is presently located.

Figure 5:
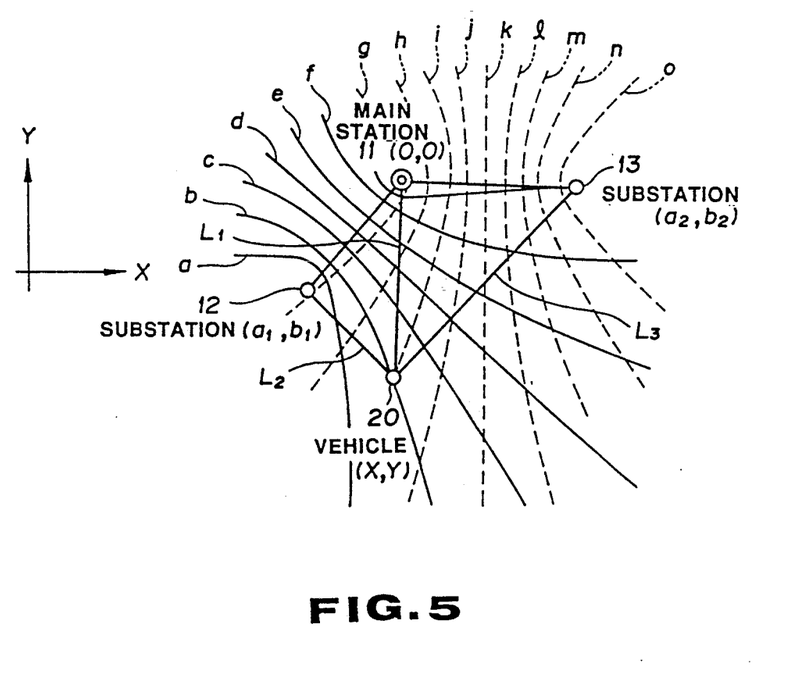
FIG. 5 is an illustrative view which shows a principle for detecting the position where the vehicle is presently located.

As shown in FIG. 5, a two-dimensional coordinate system is established for the working site such that the coordinates (known) of the main station 11 and the substations 12 and 13 are represented by (0, 0), $(a_1, b_1)$ and $(a_2, b_2)$, the coordinate of the vehicle 20 is represented by (X, Y), the distance between the main station 11 and the vehicle 20 is represented by $L_1$, the distance between the substation 12 and the vehicle 20 is represented by $L_2$ and the distance between the substation 13 and the vehicle 20 is represented by $L_3$. Thus, the difference $\Delta L_1$ between the distance $L_1$ and the distance $L_2$ and the difference $\Delta L_2$ between the distance $L_1$ and the distance $L_3$ can be expressed based on the foregoing assumption in accordance with the following equation (1).

$$\Delta L_1 = \sqrt{X^2 + Y^2} - \sqrt{(X - a_1)^2 + (Y - b_1)^2} \quad (1)$$

$$\Delta L_2 = \sqrt{X^2 + Y^2} - \sqrt{(X - a_2)^2 + (Y - b_2)^2}$$

When the position (X, Y) of the vehicle 20 where the distance difference $\Delta L_1$ assumes a constant value is sequentially plotted, the result is that, e.g., a curved line b identified by a solid line in FIG. 5 is scribed.

In other words, the distance difference $\Delta L_1$ assumes a certain constant value $\Delta L_{1-b}$, no matter how far the position of the vehicle 20 on the curved line b varies.

Similarly, other curved lines a and c to f are scribed by sequentially plotting the position (X, Y) of the vehicle 20 where the distance difference $\Delta L_2$ assumes a constant value in the same manner as mentioned above, respectively.

On the other hand, curved lines g to o identified by dotted lines in FIG. 5 are scribed by sequentially plotting the position (X, Y) of the vehicle 20 where the distance difference $\Delta L_2$ assumes a constant value, respectively. Thus, the distance difference $\Delta L_2$ assumes a certain constant value of, e.g., $\Delta L_{2-i}$, no matter how far the position of the vehicle 20 varies on the curved line i.

The distance difference $\Delta L_1$ corresponds to the difference $\Delta t_1$ between the time when the electric wave $m_1$ transmitted from the main station 11 reaches the vehicle 20 and the time when the electric wave $m_2$ transmitted from the substation 12 reaches the vehicle 20.

Similarly, the distance difference $\Delta L_2$ corresponds to the difference $\Delta t_2$ between the time when the electric wave $m_1$ transmitted from the main station 11 reaches the vehicle 20 and the time when the electric wave $m_3$ transmitted from the substation 13 reaches the vehicle 20.

Therefore, the present position (X, Y) of the vehicle 20 in the two-dimensional coordinate system can be measured and determined based on the relationship between the distance differences $\Delta L_1$ and $\Delta L_2$ expressed by the equation (1) by obtaining the distance differences $\Delta L_1$ and $\Delta L_2$ with reference to the time differences $\Delta t_1$ and $\Delta t_2$.

Figure 7:
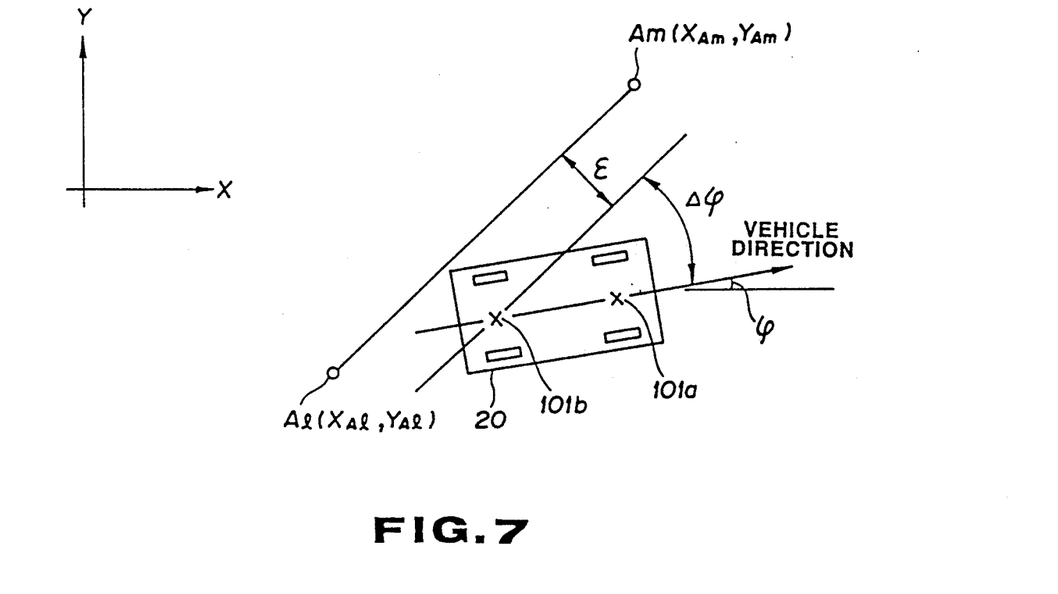
FIG. 7 is a perspective view which illustrates the operative state of the vehicle of which position is deviated from a predetermined one and of which attitude angle is deviated from a predetermined one.

As shown in FIG. 7, the vehicle 20 is equipped with antennas 101a and 101b on the front and rear sides thereof. Since the antennas 101a and 101b are arranged in that way, determination of the time differences $\Delta t_1$ and $\Delta t_2$ can be accomplished, based on the electric wave received by either one of the antennas 101a and 101b, by measuring the difference between the time when the electric wave $m_1$ is received and the time when the electric wave $m_2$ is received as well as the difference between the time when the electric wave $m_1$ is received and the time when the electric wave $m_3$ is received.

In this case, it is assumed that the position of the antenna which has been practically used for the purpose of receiving the electric wave coincides with the position (X, Y) of the vehicle 20.

Next, description will be made below with respect to a principle for obtaining the attitude angle of the vehicle 20.

Figure 6:
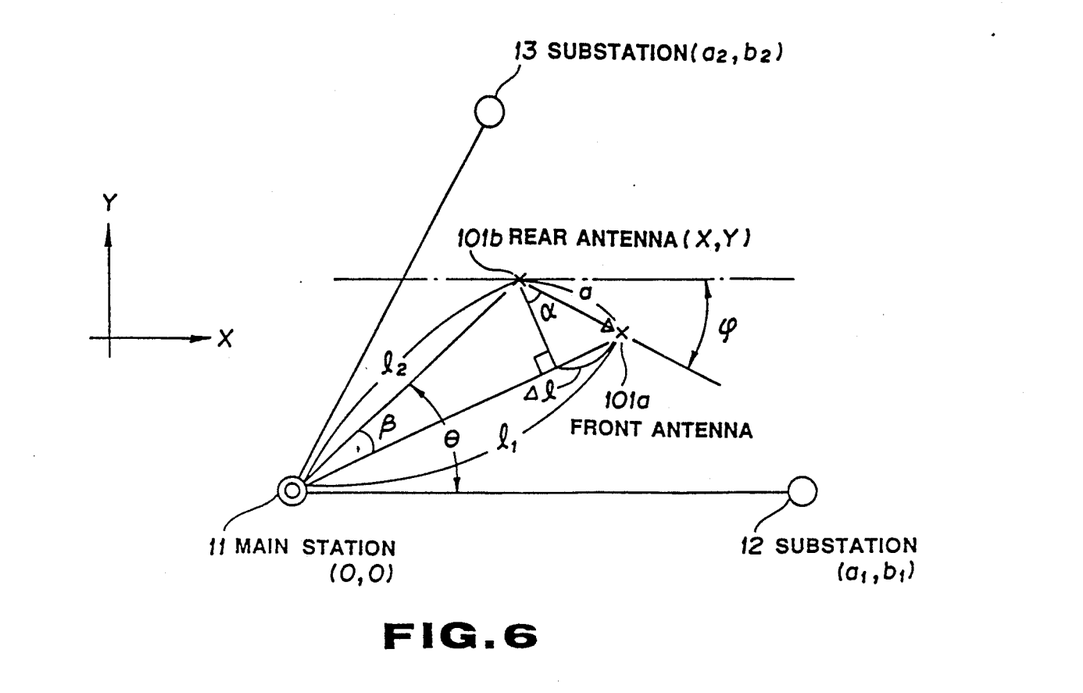
FIG. 6 is an illustrative view which shows a principle for detecting the attitude angle of the vehicle.

As shown in FIG. 6, the angle defined by the line segment extending between the main station 11 and the substation 12 and the line segment extending between the main station 11 and the rear antenna 101b is represented by $\theta$, the angle defined by the line segment extending between the antennas 101a and 101b and the line segment extending from the rear antenna 101b while intersecting the line segment extending between the main station 11 and the front antenna 101b at a right angle is represented by $\alpha$, the angle defined by the line segment between the main station 11 and the front antenna 101a and the line segment extending between the main station 11 and the rear antenna 101b is represented by $\beta$, the distance between the main station 11 and the front antenna 101a is represented by $l_1$, the distance between the main station 11 and the rear antenna 101b is represented by $l_2$, the distance between the front antenna 101a and the rear antenna 101b is represented by a (known value), and the attitude angle of the vehicle 20 relative to a X-coordinate is represented by $\psi$. Then, the relationship expressed by the following equations (2) to (7) is established among the foregoing parameters.

$$\theta = \tan^{-1}(Y/X) \quad (2)$$
$$\Delta l \approx l_1 - l_2 \quad (3)$$
$$a \cdot \sin\alpha = \Delta l \quad (4)$$
$$l_2 = \sqrt{X^2 + Y^2} \quad (5)$$
$$l_2 \cdot \sin\beta = a \cdot \cos\alpha \quad (6)$$
$$\phi = \pi/2 - \theta - \alpha + \beta \quad (7)$$

The distance difference $\Delta l$ represented by the equation (3) can be expressed below in a modified state by using the difference $\Delta t_e$ between the time when the electric wave transmitted from the main station 11 reaches the front antenna 101a and the time when the electric wave transmitted from the main station 11 reaches the rear antenna 101b.

$$\Delta l = c \cdot \Delta t_e \quad \ldots (8)$$

where c designates the speed with which the electric wave has been transmitted to the front antenna 101a and the rear antenna 101b.

The angle $\theta$ can be obtained in accordance with the equation (2) when the coordinate (X, Y) of the vehicle can be measured and determined in accordance with the aforementioned principle for measuring the respective positions.

In addition, the angle $\alpha$ can be obtained based on the distance difference $\Delta l$ in accordance with the equation (4), when the distance difference $\Delta l$ is determined by measuring the time difference $\Delta t_e$ shown in the equation (8), and the angle $\beta$ can be obtained based on the distance $l_2$ and the angle $\alpha$ in accordance with the equation (6), when the distance $l_2$ is derived from the coordinate (X, Y) in accordance with the equation (5).

Once the angles $\theta$, $\alpha$ and $\beta$ are determined, the attitude angle $\psi$ of the vehicle 20 can be obtained in accordance with the equation (7).

Referring to FIG. 6, it is assumed that the position where the rear antenna 101b is arranged on the vehicle 20 coincides with the position (X, Y) of the vehicle 20.

Although the time difference $\Delta t_e$ represented by the equation (8) is determined by using the electric wave transmitted from the main station 11, it is possible to detect the attitude angle $\psi$ by using the electric wave transmitted from the substation 12 or 13 in place of the electric wave transmitted from the main station 11.

As shown in FIG. 3, two target courses A and B are preset in order to assure that the vehicle 20 moves to the working site while the movement of the vehicle 20 is correctly induced.

Figure 4:
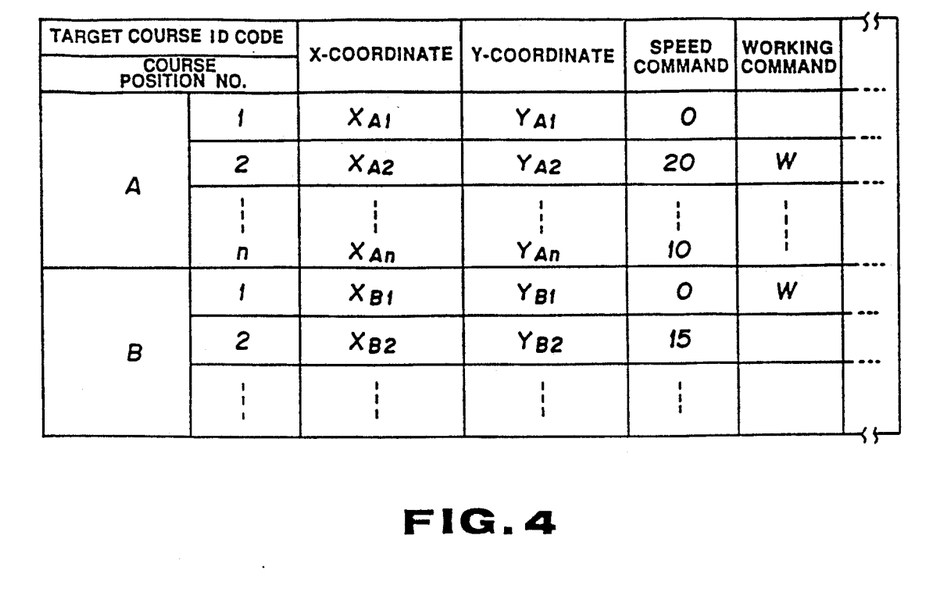
FIG. 4 is a diagram in the form of a table which illustrates by way of example the content of items stored in target course storing means.

Referring to FIG. 4, respective coordinates ($X_{A1}$, $Y_{A1}$) to $X_{An}$, $Y_{An}$) in the two-dimensional coordinate system for a plurality of positions $A_1$ to $A_n$ on the target course A, respective coordinates ($X_{B1}$, $Y_{B1}$) to ($X_{Bn}$, $Y_{Bn}$) in the two-dimensional coordinate system for a plurality of positions $B_1$ to $B_n$ on the target course B, a series of vehicle speed commands at the positions $A_1$ to $A_n$ as well as at the positions $B_1$ to $B_n$ and a series of work commands for allowing the vehicle 20 to work at a specific position among the foregoing positions are shown in the drawing in the form of a table.

The content of items shown on the table in FIG. 4 is preliminarily stored in target course storing means 103 by actuating course input selecting means 102 (e.g., a key board) in the unit 100 mounted on the vehicle 20 as shown in FIG. 2. In addition, designation for the target courses A and B shown in FIG. 2 is accomplished by actuating the course input selecting means 102.

Now, it is supposed that, e.g., the target course A is designated by actuating the course input selecting means 102. In this case, the following control is carried out in order to assure that the movement of the vehicle 20 along the target course A is correctly induced.

Specifically, for example, a station 104 mounted on the vehicle 20 shown in FIG. 2 determines the difference $\Delta t_1$ between the time when the electric wave $m_1$ reaches the rear antenna 101b and the time when the electric wave $m_2$ reaches the rear antenna 101b and the difference $\Delta t_2$ between the time when the electric wave $m_1$ reaches the rear antenna 101b and the time when the electric wave $m_3$ reaches the rear antenna 101b.

It should be noted that the station 104 mounted on the vehicle 20 includes detecting means for detecting the phase difference between the phase of the electric wave $m_1$ and the phase of the electric wave $m_2$ and the phase difference between the phase of the electric wave $m_1$ and the phase of the electric wave $m_3$ so that the time difference $\Delta t_1$ and the time difference $\Delta t_2$ are determined based on the foregoing phase differences.

As mentioned above, the time difference $\Delta t_1$ and the time difference $\Delta t_2$ correspond to the distance difference $\Delta L_1$ and the distance difference $\Delta L_2$ represented by the equation (1). Thus, vehicle position detecting means 105 determines the position (X, Y) of the vehicle 20, i.e., the position (X, Y) of the rear antenna 101b based on the time differences $\Delta t_1$ and $\Delta t_2$ in accordance with the equation (1).

On the other hand, in response to the electric wave transmitted from a specific station among the main station 11 and the substations 12 and 13, e.g, the main station 10, the station 104 mounted on the vehicle 20 determines the difference between the time when the electric wave reaches the front antenna 101a and the time when the electric wave reaches the rear antenna 101b, i.e, the time difference $\Delta t_e$ between the foregoing times represented by the equation (8) between the electric wave so as to allow a signal corresponding to the time difference $\Delta t_e$ to be outputted to vehicle attitude angle detecting signal 105'.

It should be noted that the time difference $\Delta t_e$ is detected based on the difference between the phase of the electric wave transmitted from the main station 11 and received by the front antenna 101a and the phase of the electric wave transmitted from the main station 11 and received by the rear antenna 101b.

The vehicle attitude angle detecting means 105' determines the attitude angle $\psi$ of the vehicle 20 based on the time difference $\Delta t_e$ in accordance with the equations (2), (4) and (7).

In such a manner as mentioned above, the vehicle position detecting means 105 and the vehicle attitude angle detecting means 105' determine the present position (X, Y) of the vehicle 20 and the attitude angle $\psi$ at an interval of time $\tau$, respectively, so that signals representing the present position (X, Y) and the attitude angle $\psi$ assumed by the vehicle 20 are added to vehicle control calculating means 106.

In response to the inputted foregoing signals, the vehicle control calculating means 106 sequentially reads from the target course storing means 103 a series of vehicle speed commands with respect to the positions $A_1$ to $A_n$ on the target course A as well as the coordinates $(X_{A1}, Y_{A1})$ to $(X_{An}, Y_{An})$ indicating the positions $A_1$ to $A_n$ shown in FIG. 4. Subsequently, the vehicle control calculating means 106 calculates a steering command based on the coordinates representing the positions $A_1$ to $A_n$, the present position (X, Y) where the vehicle 20 is presently located and the attitude angle $\psi$ of the vehicle 20.

Here, a step of calculating the steering command will be described below with reference to FIG. 7.

It is considered that the target course A is composed of a plurality of bent lines, each extending between the adjacent coordinates, i.e., two coordinates selected from a series of the coordinates $(Y_{A1}, Y_{A1})$, $X_{A2}, X_{A2})$, --- $(X_{An}, Y_{An})$. Then it is assumed that the movement course of the vehicle 20 is successively shifted one after another in accordance with the order as represented by $\overline{A_1A_2} \rightarrow \overline{A_2A_3} \rightarrow \cdots \overline{A_{n-1}A_n}$. It should be added that determination of the foregoing shifting is made based on the present position (X, Y) of the vehicle 20 which has been detected by the vehicle position detecting means 105.

Now, it is supposed that the vehicle 20 assumes a line segment $\overline{A_lA_m}$ and it is presently located at the position (X, Y). At this time, the lateral deviation $\epsilon$ of the vehicle 20 from the line segment $\overline{A_l A_m}$ is expressed by the following equation (9).

$$\epsilon = \frac{(X_{Am} - Y_{Al}) \cdot X_K - (X_{Am} - X_{Al}) \cdot X_K}{\sqrt{(Y_{Am} - Y_{Al})^2 + (X_{Am} - X_{Al})^2}} + \frac{(X_{Am} - X_{Al}) \cdot Y_{Al}}{\sqrt{(Y_{Am} - Y_{Al})^2 + (X_{Am} - X_{Al})^2}} \quad (9)$$

In addition, the deviation angle $\Delta \psi$ of the vehicle 20 relative to the line segment $\overline{A_lA_m}$ is expressed by the following equation (10) in the form of a difference between the angular inclination of the line segment $A_lA_m$ and the attitude angle $\psi$ shown in FIG. 6.

$$\Delta \phi = \tan^{-1} \frac{Y_{Am} - Y_{Al}}{X_{Am} - X_{Al}} - \phi \quad (10)$$

The steering angle command $\delta$ required for allowing the movement of the vehicle 20 along the running course A to be correctly induced is determined in accordance with the following equation (11) based on the lateral displacement $\epsilon$ and the deviation angle $\Delta \psi$ of the vehicle 20.

$$\delta = K_1 \cdot \epsilon + K_2 \cdot \Delta \phi \quad \ldots (11)$$

where $K_1$ and $K_2$ are a constant, respectively.

Thus, the steering angle command $\delta$ can be determined when the lateral deviation $\epsilon$ and the deviation angle $\Delta \psi$ of the vehicle 20 are obtained.

The vehicle control calculating means 106 shown in FIG. 2 obtains the steering angle command $\delta$ of the vehicle 20 in the above-described manner so that the signal representing the steering angle command $\delta$ as well as the signals representing the vehicle speed commands in correspondence to the coordinates $(X_A, Y_{Al})$ and $X_{Am}, Y_{Am})$ read from the target course storing means 103 are added to steering control means 108 via vehicle control selecting means 107.

The steering control means 108 obtains the deviation of the signal representing the steering angle command $\delta$ from the output signal outputted from a steering angle sensor 109 for indicating the actual steering angle of the vehicle 20 so that a flow rate of pressurized hydraulic oil flowing through a servo-valve 110 is controlled correctly.

The pressurized hydraulic oil which has been controlled by the servo-valve 110 is fed to a hydraulic cylinder 112 via an electromagnetic switching valve 111, whereby the hydraulic cylinder 112 is actuated such that the actual steering angle coincides with the angle which has been set in response to the steering angle command $\delta$.

Consequently, the vehicle 20 is steered in such a direction that the lateral deviation $\epsilon$ and the deviation angle $\psi$ are eliminated. This leads to the result that the vehicle 20 runs along the course A.

On the other hand, the vehicle control selecting means 107 is operated in conformity with the aforementioned vehicle commands and the actual vehicle speed detected by a vehicle speed sensor 113 in such a manner that the signal representing a governor position command is added to governor controlling means 114, the signal representing a speed stage command is added to transmission controlling means 115, the signal representing a retarder brake pressure command is added to retarder controlling means 116 and the signal representing a brake command is added to brake controlling means 117.

The governor controlling means 114 determines the deviation of the signal representing the governor position command from the output signal outputted from a governor sensor 118 to represent the actual governor position so that a motor 119 for driving a governor 121 is driven depending on the foregoing deviation.

As a result, the position of a fuel control lever in the governor 121 operatively connected to the motor 119 via a clutch 120 is adjusted to the position which has been determined in conformity with the foregoing governor position command.

In response to the signal representing the speed stage command, the transmission controlling means 115 actuates an electromagnetic switching valve 124 when the actual engine speed of an engine 123 detected by an engine speed sensor 122 reaches the engine speed adapted to the command speed stage, whereby the speed stage of a transmission 125 is set to the command speed stage.

The retarder controlling means 116 obtains the deviation of the signal representing the retarder brake pressure command from the output signal outputted from an air pressure sensor 126 to represent the actual retarder brake pressure, whereby a flow rate of pressurized hydraulic oil flowing through an air servo-valve 127 is correctly controlled depending on the foregoing deviation. This causes a retarder 128 to be driven thereby to determine a braking force in conformity with the foregoing command.

In response to the signal representing the brake command, the brake controlling means 117 drives a brake 129 and stops the vehicle 20.

As the respective components 114 to 117 as mentioned above function correctly, the vehicle 20 runs at the speed corresponding to the vehicle speed command.

As shown in FIG. 4, a working command w at the position $X_{A2}$, $Y_{A2}$) on the target course A is stored in the target course storing means 103 shown in FIG. 2.

In the case where the working command w is stored in that way, the vehicle control selecting means 107 shown in FIG. 2 receives the working command w via the vehicle control calculating means 106 so that the signal representing the work command w is added to working machine controlling means 130.

As a result, the working machine controlling means 130 drives a working machine driving cylinder 131 at the position ($X_{A2}$, $Y_{A2}$) on the target course A so that the working machine (a vessel in the case of a damp truck) conducts a work in conformity with the working command.

It should be noted that obstacle recognizing means 132 (e.g., a TV camera) photographs the direction of movement of the vehicle 20 so that the signal derived from the foregoing photographing is added to obstacle position detecting means 133.

In a case where an obstacle appears on the screen of the obstacle recognizing means 132, the obstacle position detecting means 133 performs a conventional image processing operation to detect the position of the obstacle so that the signal representing the position of the obstacle is added to danger predicting means 134.

When the position of the obstacle is located in the direction of movement of the vehicle 20, the danger predicting means 134 is operated such that the signal representing a danger is added to the vehicle control selecting means 107. This causes the vehicle control selecting means 107 to output a steering control signal to the steering control means 108 so as to allow the vehicle 20 to move around the obstacle. Otherwise, the vehicle control selecting means 107 outputs a vehicle stop signal to the brake controlling means 117.

Figure 8A:
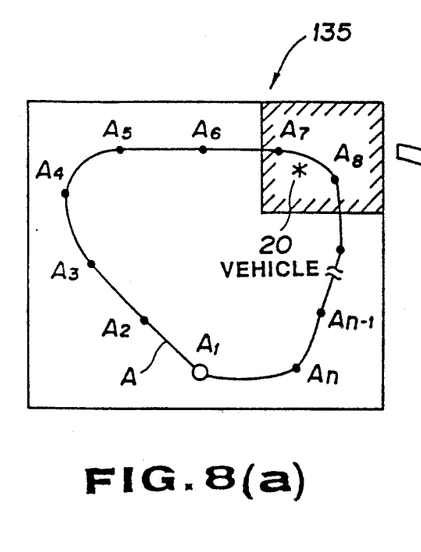
FIG. 8(a) and FIG. 8(b) are a schematic view which illustrates by way of example the content of items displayed on the screen of a running monitor, respectively.

Additionally, the vehicle control selecting means 107 executes the following function. Specifically, in response to signals from the target course storing means 103, the vehicle position detecting means 105, the steering angle sensor 109, the engine speed sensor 122 and the vehicle speed sensor 113, the vehicle control selecting means 107 allows the present position of the vehicle 20 on the target course A to be displayed on the screen of a running monitor 135, e.g., as shown in FIG. 8(a). In addition, the actual steering angle, the actual engine speed and the actual vehicle speed are displayed at suitable locations on the screen of the running monitor 135.

Figure 8B:
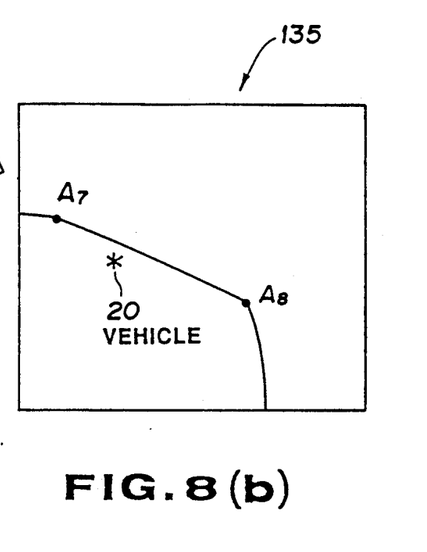

It should be added that a certain location in the vicinity of the position where the vehicle 20 is presently located may be displayed on the screen of the running monitor 135 in an enlarged scale, as shown in FIG. 8(b).

On the other hand, the signals representing the target course A, the position where the vehicle 20 is presently located, the actual steering angle, the actual engine speed and the actual vehicle speed are added to vehicle data transferring means 136 from the vehicle control selecting means 107.

The vehicle data transferring means 136 transmits to vehicle data receiving means 14 of the unit 10 installed on the ground shown in FIG. 1 the foregoing signals and the signal representing a vehicle number given to the vehicle 20 via an electric wave.

The vehicle data receiving means 14 serves to allow the respective received signals to be added to the vehicle monitor 15 and vehicle controlling means 16. This causes the vehicle monitor 15 to display the position where the vehicle 20 is presently located on the target course A, the actual steering angle, the actual engine speed and the actual vehicle speed on the screen thereof. In addition, in response to signals transmitted from other vehicle, the vehicle monitor 15 displays similar data to the foregoing ones on the screen thereof with respect to the other vehicle.

In response to the aforementioned signals, the vehicle controlling means 16 practically recognizes the current status on the movement of the vehicle 20. Additionally, in response to the signals transmitted from the other vehicle, the vehicle controlling means 16 practically recognizes the current status on the movement of the other vehicle.

The content of various items displayed on the screen of the vehicle monitor and the current status on the movement of the vehicles practically recognized by the vehicle controlling means 16 are utilized for properly controlling each of the vehicles.

It should be noted that a manual valve 137 shown in FIG. 2 is actuated when a manual steering operation is performed. An acceleration pedal 138 is operatively linked to the fuel control lever of the governor 121.

It should be added that the target course storing unit 17 shown in FIG. 1 is arranged in order to transfer an information on the running courses and other informations shown by way of example in FIG. 4 to the vehicle 20 from the ground side.

Specifically, the information on the running courses and other informations stored in the target course storing unit 17 are transmitted to the main station 11 via an electric wave. At this time, the station 104 mounted on the vehicle 20 shown in FIG. 2 receives the information on the running courses and other informations and they are then stored in the target course storing means 103.

With such construction as mentioned above, there is no need of allowing the information on the running courses and other informations to be inputted into the course input selecting means 102.

The present invention has been described above with respect to the embodiment wherein two antennas 101a and 101b are mounted on the vehicle 20 at the front part and the rear part of the same to detect the attitude angle of the vehicle 20. However, the present invention should not be limited only to this embodiment. Alternatively, the antennas 101a and 101b may be mounted, e.g., on the both sides of the vehicle 20, i.e., on the left-hand and right-hand sides of the same. In other words, the antennas 101a and 101b can be mounted at arbitrarily determined positions on the vehicle 20, provided that an adequate distance is maintained therebetween (It should be noted that it is not allowable that they are mounted in the spaced relationship in the vertical direction).

INDUSTRIAL APPLICABILITY

As will be apparent from the above description, the apparatus for properly controlling the movement of a vehicle in accordance with the present invention is usefully available for the purpose of allowing the movement of the vehicle along a predetermined course to be correctly induced with a high accuracy. Especially, the apparatus of the present invention is preferably employable in a case where a vehicle for outdoor works such as a damp truck or the like vehicle is operated under an unmanned condition, i.e., without necessity for any driver to be ridden on the vehicle.

I claim:

1. An apparatus for controlling the movement of a vehicle, wherein said apparatus includes electric wave transmitting means for transmitting a first electric wave, a second electric wave and a third electric waves in synchronization with each other from predetermined positions on the ground different from each other and an unit mounted on said vehicle and wherein said unit mounted on the vehicle comprises;

a first antenna and a second antenna arranged on the vehicle in parallel with each other with a predetermined distance kept therebetween, first time difference detecting means for detecting the difference between the time when said first electric wave reaches said first antenna and the time when said second electric wave reaches said first antenna as well as the difference between the time when said first electric wave reaches said first antenna and said third electric wave reaches said first antenna, in response to said first electric wave, said second electric wave and said third electric wave each of which is received by said first antenna, position detecting means for detecting the position where the vehicle is presently located, based on said time differences detected by said first time difference detecting means, second time difference detecting means for detecting the difference between the time when said first electric wave reaches said first antenna and the time when said first electric wave reaches said second antenna, in response to said first electric wave received by said first antenna and said second antenna, attitude angle detecting means for detecting the attitude angle with which the vehicle is moving, based on said time difference detected by said second time difference detecting means storing means for allowing target courses for the vehicle to be stored therein, calculating means for calculating a steering angle command for allowing the vehicle to move along one of said target courses, based on the position where the vehicle is presently located, the attitude angle with which the vehicle is moving and the target courses, and steering control means for controlling a steering angle to be assumed by the vehicle to a certain magnitude in conformity with said steering angle command.

2. An apparatus for controlling the movement of a vehicle as claimed in claim 1, wherein one of the first antenna and the second antenna is arranged on the front part of the vehicle and the other one is arranged on the rear part of the vehicle.

3. An apparatus for controlling the movement of a vehicle as claimed in claim 1, wherein said first time difference detecting means detects the difference between the time when the first electric wave reaches the first antenna and the time when the second electric wave reaches the first antenna, based on the difference between the phase of the first electric wave received by the first antenna and the phase of the second electric wave received by the first antenna and moreover detects the difference between the time when the first electric wave reaches the first antenna and the time when the third electric wave reaches the first antenna, based on the difference between the phase of the first electric wave received by the first antenna and the phase of the third electric wave received by the first antenna.

4. An apparatus for controlling the movement of a vehicle as claimed in claim 1, wherein said second time difference detecting means detects the difference between the time when the first electric wave reaches the first antenna and the time when the first electric wave reaches the second antenna, based on the difference between the phase of the first electric wave received by the first antenna and the phase of the electric wave received by the second antenna.

5. An apparatus for controlling the movement of a vehicle as claimed in claim 1, wherein said storing means serves to allow coordinates representing a plurality of locations on each of the target courses to be stored therein as a target course to be assumed by the vehicle.

6. An apparatus for controlling the movement of a vehicle as claimed in claim 1, wherein said storing means serves to allow a vehicle speed command indicating a speed to be assumed by the vehicle on each of the target courses to be stored therein as a content to be stored therein and moreover the unit mounted on the vehicle is added with means for adjusting the speed with which the vehicle is moving to a speed in conformity with said vehicle speed command.

7. An apparatus for controlling the movement of a vehicle as claimed in claim 1, wherein said storing means serves to allow a work command indicating a work to be conducted by the vehicle on one of the target courses to be stored therein as a content to be stored therein and moreover the unit mounted on the vehicle is added with means for allowing the vehicle to conduct a work in conformity with said work command.

* * * * *

UNITED STATES PATENT AND TRADEMARK OFFICE
CERTIFICATE OF CORRECTION

PATENT NO. : 5,299,130
DATED      : March 29, 1994
INVENTOR(S): Toyoichi Ono

It is certified that error appears in the above-indentified patent and that said Letters Patent is hereby corrected as shown below:

On the title page: Item [73]   the assignee designation "Toyoichi Ono, Japan" should read --Kabushiki Kaisha Komatsu Seisakusho, Tokyo, Japan--.

Signed and Sealed this

Thirtieth Day of April, 1996

Attest:

BRUCE LEHMAN

Attesting Officer        Commissioner of Patents and Trademarks